United States Patent
Kaneko et al.

(10) Patent No.: US 10,305,672 B2
(45) Date of Patent: May 28, 2019

(54) COMMUNICATION DEVICE AND COMMUNICATION SYSTEM

(71) Applicant: DENSO CORPORATION, Kariya, Aichi-pref. (JP)

(72) Inventors: Naoji Kaneko, Kariya (JP); Takamori Ookawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/051,661

(22) Filed: Aug. 1, 2018

(65) Prior Publication Data
US 2019/0052451 A1 Feb. 14, 2019

(30) Foreign Application Priority Data
Aug. 9, 2017 (JP) .................. 2014-154152

(51) Int. Cl.
*H04L 7/00* (2006.01)
*H04L 25/49* (2006.01)
*H04J 3/06* (2006.01)

(52) U.S. Cl.
CPC ........ *H04L 7/0008* (2013.01); *H04L 25/4902* (2013.01); *H04J 3/06* (2013.01)

(58) Field of Classification Search
CPC ....... H04L 7/0008; H04L 25/4902; H04J 3/06
See application file for complete search history.

(56) References Cited

U.S. PATENT DOCUMENTS

| 3,846,639 | A | * | 11/1974 | Ueda | G01R 31/006 307/9.1 |
| 5,384,765 | A | * | 1/1995 | Sakagami | G05B 9/02 340/458 |
| 9,705,697 | B1 | * | 7/2017 | Tomita | H04B 15/005 |
| 2009/0193273 | A1 | * | 7/2009 | Kobayashi | G06F 1/26 713/320 |
| 2014/0036988 | A1 | | 2/2014 | Kashima et al. | |

FOREIGN PATENT DOCUMENTS

JP 2016-058949 A 4/2016

OTHER PUBLICATIONS

SAE International. "Surface Vehicle Standard", SAEJ1850, Issued Nov. 1988.

\* cited by examiner

*Primary Examiner* — David S Huang
(74) *Attorney, Agent, or Firm* — Posz Law Group, PLC

(57) ABSTRACT

A communication system includes a master node and one more slave nodes connected via a transmission line. The master node is configured to output a first PWM signal having a shorter low level time and a second PWM signal having a longer low level time. The slave node is configured to output the second PWM signal when detecting a high to low signal level change on the transmission line. The master node detects a time delay as measured from when an input signal to a transmission buffer falls to when an output signal from a reception buffer falls. The time delay is an index value used to change the low level time of the first PWM signal when the time delay is equal to or less than a preset value.

6 Claims, 11 Drawing Sheets

COMMUNICATION DEVICE AND COMMUNICATION SYSTEM

CROSS REFERENCE TO RELATED APPLICATION

The present application is based on and claims the benefit of priority of Japanese Patent Application No. 2017-154152, filed on Aug. 9, 2017, the disclosure of which is incorporated herein by reference.

TECHNICAL FIELD

The present disclosure generally relates to a data communication technique using a pulse width modulation signal.

BACKGROUND INFORMATION

Patent document 1, i.e., Japanese Patent No. 2014-30125, discloses a communication system in which two or more nodes connected to a transmission line perform data communication by using a line code of pulse width modulation (PWM) signals in two types with respectively different durations (i.e., continuation time) for a low level time (i.e., a duration of time in which a signal is in or at a low level). PWM is an abbreviation for pulse width modulation.

The communication system of the patent document 1 has the following requirements.

When a high level signal and a low level signal are simultaneously output from the different nodes on the transmission line, the signal level of the transmission line is set to the low level. That is, on the transmission line, priority is given to the low level signal over the high level signal.

The PWM signal as a line code changes from a high level as the first level to low level as the second level at a boundary of a bit. The PWM signal as a line code also changes from a low level to a high level in the middle of a bit. Further, the "logical value 1" and the "logical value 0" are distinguished by a different duration for low level time in a PWM signal, i.e., "a low level time." For example, from among two types of PWM signals respectively having a different low level time, a PWM signal with a shorter low level time (i.e., the first PWM signal) corresponds to a "logical value 1", and a PWM signal with a longer low level time (i.e., the second PWM signal) corresponds to a "logical value 0."

One of two or more nodes on the transmission line is a master node which supplies a clock signal to the other nodes via the transmission line. The dock signal supplied by the master node is an edge at which the signal level of the transmission line changes from a high level to a low level, i.e., the edge corresponding to the boundary of a bit. Therefore, a master node outputs one of the first PWM signal and the second PWM signal to the transmission line. Note that, even in a no-data transmission period, a master node continues to output the first PWM signal to the transmission line in order to supply a clock signal to other nodes.

From among a plurality of two or more nodes on the transmission line, nodes other than the master node serve as slave nodes, to which a dock signal is supplied from the master node via the transmission line. When outputting the second PWM signal to the transmission line (i.e., when transmitting a "logical value 0"), the slave node starts a signal output operation of the second PWM signal when a high-to-low signal level change of the transmission line due to a signal output operation of the master node is detected.

In the communication system described above, there may be difficulties in increasing the communication speed. Such difficulties may be described in reference to FIGS. 12A and 12B.

In the illustration of FIGS. 12A and 12B, time t1 and time t2 respectively designate a timing of the boundary of a bit, or rather "a bit boundary."

TXm is a signal input to a transmission buffer of a master node. TXs is a signal input to a transmission buffer of a slave node. In this example, the transmission buffer performs a signal output operation for changing the signal level of the transmission line from a high level to a low level, while the signal input to the transmission buffer is (i.e., stays) in a low level. Further, a low level time Tm1 of TXm is a low level time in which the master node outputs the first PWM signal to the transmission line, and a low level time Ts0 of TXs is a low level time in which the slave node outputs the second PWM signal to the transmission line.

Vth is a threshold used to determine whether the signal level of the transmission line is in a high level or in a low level in each of the master node and the slave node.

FIG. 12A shows a situation in which a time constant of the transmission line takes a minimum value of a specification range, i.e., "a specification minimum." FIG. 12B shows a situation in which a time constant of the transmission line takes a maximum value of the above-mentioned specification range i.e., "a specification maximum." The time constant of the transmission line changes at least according to the number of the nodes connected to the transmission line.

As shown in FIGS. 12A and 12B, after TXm changes to a low level, i.e., after the first PWM signal begins to be output at a low level by the master node, a certain time delay caused by the time constant of the transmission line is observed until the signal level of the transmission line changes to a low level.

Therefore, the low level time Tm1 of TXm is set as a duration of time that enables the signal level of the transmission line to be changed to a low level, even when the time constant of the transmission line takes the specification maximum, as shown in FIG. 12B.

On the other hand, as shown in FIG. 12A and FIG. 12B, when TXs changes to low level, i.e., at a time when the slave node starts to output the second PWM signal at a low level, the signal level of the transmission line falls to the threshold Vth due to the signal output operation of the master node.

Further, the low level time Ts0 of TXs is set to a longer duration than a time Ta required for TXm to return to a high level after TXs changes to a low level. In such cases, the duration of Ts0 is greater than or equal to the sum of Ta and a preset specification time RT, e.g., Ts0≥Ta+RT. Such a setting is required because it is necessary to provide a difference between the low level time of the first PWM signal and the low level time of the second PWM signal, which needs to be equal to or greater than the preset specification time RT. Note that the time around Ta is a time where both of the master node and the slave node change the transmission line to a low level. In the following, the time Ta is designated as a duplex output time Ta. Further, in FIGS. 12A and 12B, the waveform of the dashed-dotted line represents a signal waveform of the transmission line when only the master node outputs the first PWM signal, that is, without an output of the second PWM signal from the slave node.

Here, as readily seen from a comparison between FIGS. 12A and 12B, the smaller the time constant of the transmission line is, the shorter a time Tb, where Tb is the time from when TXm begins to fall from a high level to a low level to when TXs begins to fall to a low level. The decrease in the duration of Tb increases the duration of the duplex output time Ta. Therefore, the low level time Ts0 of TXs is set as a duration equal to or longer than the duplex output time Ta when the time constant of the transmission line takes the specification minimum, as shown in FIG. 12A. Note that, in FIG. 12A and FIG. 12B, the low level time Tm1 of TXm has the same duration, and the low level time Ts0 of TXs has the same duration.

However, as shown in FIG. 12B, compared to a time when the time constant of the transmission line increases to the specification maximum, the duplex output time Ta becomes shorter when the time constant of the transmission line is set to the specification minimum. As such, as shown in FIG. 12B, the difference between the low level time Tm1 of the first PWM signal and the low level time Ts0 of the second PWM signal is greater than the preset specification time RT, meaning that the amount of low level time Ts0 is excessive.

Therefore, when a transmission speed increases and a bit length shortens, a bit error, e.g. a bit "straddling" or "shortfall", may occur as shown in FIG. 12B, where the signal level of the transmission line does not return to a high level by time t2, that is, before a bit boundary timing of the next bit, which may corrupt the data communication and/or cause additional communication errors. Such a problem may be more noticeable when the signal on the transmission line rises to a high potential level from a low potential level.

SUMMARY

It is an object of the present disclosure to provide a technique that enables an increase in communication speed for data communication using a PWM signal.

In an aspect of the present disclosure, a communication system may include a first communication device serving as a master node and a second communication device serving as a slave node. The communication system may further include a transmission line, to which a plurality of nodes are connected, e.g., the first communication device and the second communication device. The transmission line may be configured to set the signal level of the transmission line to a second level, when a signal at a first level and a signal at the second level are simultaneously output from the different nodes of the transmission line.

The data communication performed by the communication system between the different nodes may be performed by using a line code. The line code may use two different types of pulse width modulation signals. The first type of PWM signal may be configured to change signal levels at a bit boundary timing from the first level to the second level. The second type of PWM signal may be configured to change the middle of a bit from the second level to the first level at different second level times, that is, at a second level continuation time or a second level duration that differs from the second level time of the first type of PWM signal.

One of the plurality of nodes in the communication system may be the first communication device serving as the master node. The master node may be configured to output either one of the two types pulse width modulation signals to the transmission line, that is, either a first PWM signal with a shorter second level time or a second PWM signal with a longer second level time.

The remainder of the plurality of nodes in the communication system may be one or more second communication devices serving as slave nodes. When the second PWM signal is output to the transmission line, the slave node may start a signal output operation to output the second PWM signal when the slave node detects a signal level change of the transmission line from the first level to the second level due to a signal output operation of the master node. In other words, the slave node may output the second PWM signal upon detecting a trigger by the master node.

The communication device serving as the master node of the communication system may include: a signal processor configured to function as a detector and a time changer.

The detector may detect an index value that correlates to a time constant of the transmission line.

The time changer may change the second level time of the first PWM signal output to the transmission line from the communication device serving as a master node based on the index value detected by the detector. The time changer may set the second level time of the first PWM signal to a shorter duration when an index value is detected indicating a smaller-than preset time constant value (i.e., a preset time constant value set within a specification range of the communication system) than when an index value is detected indicating a greater-than preset time constant value. Thus, when the time constant value of the transmission line is smaller than the preset time constant value, the second level time of the first PWM signal output to the transmission line from the first communication device serving as a master node may be shorter compared to when the time constant value of the transmission line is greater than the preset time constant value.

According to the communication device described above, even when the second level time of the second PWM signal output from a slave node to the transmission line is shortened, such a shortened second level time of the second PWM signal and the second level time of the first PWM signal output from the first communication device (i.e., the master node) to the transmission line are still easily distinguishable from one another. Further, because the second level time of the second PWM signal from the slave node can be shortened, a bit error, that is, the bit straddling or bit shortfall described above, where the signal level of the transmission line does not return to the first level before the bit boundary of the next bit, may be prevented or reduced. That is, the communication device described above can simultaneously achieve, both (i) a sufficient differentiation between the second level time of the first PWM signal output from the master node and the second level time of the second PWM signal output from the slave node, and (ii) a prevention/limitation of the bit straddling/shortfall errors, without comprising the communication speed. As such, the communication speed of the communication system can be easily increased.

In another aspect of the present disclosure, the communication system described above may include a master node that includes a signal processor configured to function as the detector, and a slave node that includes a signal processor configured to function as an obtainer and a time controller.

The detector in the master node may detect an index value that correlates to the time constant of the transmission line.

The obtainer in the slave node may obtain, from the master node, information regarding the index value detected by the detector. The time controller may then change the second level time of the second PWM signal output by the slave node to the transmission line based on the information obtained by the obtainer. The time controller may set the second level time of the second PWM signal to a shorter duration when the obtained information indicates a greater-than preset time constant value (i.e., a preset constant value that is set within a specification range according to the communication system) than when the obtained information indicates a smaller-than preset time constant value. Thus, when the time constant of the transmission line is greater than the preset time constant, the second level time of the second PWM signal output to the transmission line from the slave node may be shorter compared to when the time constant of the transmission line is smaller than the preset time constant.

The configuration described above can simultaneously achieve, both (i) a sufficient differentiation between the second level time of the first PWM signal output from the master node and the second level time of the second PWM signal output from the slave node, and (ii) a prevention/limitation of the bit straddling/shortfall errors, without compromising the communication speed. As such, the communication speed of the communication system can be easily increased.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, embodiments of the present disclosure are described with reference to the drawings.

1. First Embodiment

[1-1. Configuration of Communication System]

Figure 1:
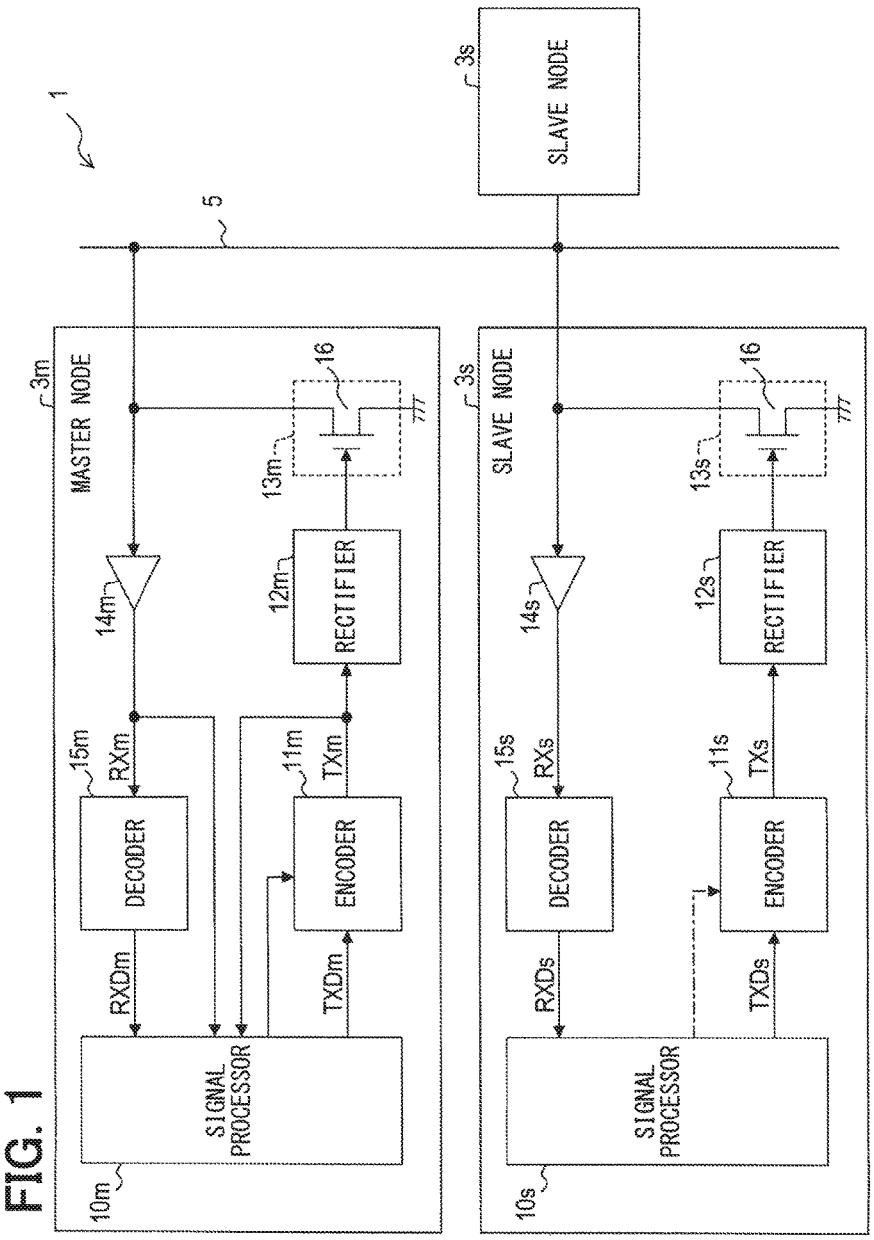
FIG. 1 is a block diagram of a configuration of a communication system in a first embodiment of the present disclosure.

As shown in FIG. 1, a communication system 1 of the first embodiment may be a communication system disposed in a vehicle. The communication system includes a first communication device 3m serving as a master node 3m and at least one second communication device serving as a slave node 3s. That is, the communication system may include a plurality (i.e., two or more) of communication devices. As used herein, the first communication device 3m may be referred to as the master node 3m and the one or more second communication device(s) 3s may be referred to as the slave node(s) 3s. The master node 3m and at least one slave node 3s are connected to each other via a bus-like transmission line 5. In FIG. 1, even though two slave nodes 3s are illustrated, the number of the slave nodes 3s may be three or more, or may be only one. In the following, one slave node 3s is described as a representative example of the plurality of slave nodes 3s.

The master node 3m is a node which supplies a clock to the slave node 3s via the transmission line 5. The slave node 3s is a node which performs communication in synchronization with the clock supplied via the transmission line 5.

The master node 3m may be, for example, an electronic control unit (ECU) which controls a meter device or the like. The slave node 3s may also be an ECU that may control, for example, a seat, a mirror, a position of a steering wheel, or other components in the vehicle. Note that the master node 3m and the slave node 3s may be collectively designated as a node 3, when not distinguishing between the master node 3m and the slave node 3s.

[1-2. Transmission Line]

When a signal in the first level and a signal in the second level are simultaneously output from different nodes 3, the transmission line 5 is configured so that the signal level of the transmission line 5 changes to the second level. Bus arbitration may be realized using such a configuration of the transmission line 5 (i.e., changing to the second level during simultaneous signal level outputs). The bus described above indicates the transmission line 5. In the present embodiment, a high level is designated as the first level and a low level is designated as the second level, which may be reversed in other embodiments.

Figure 2:
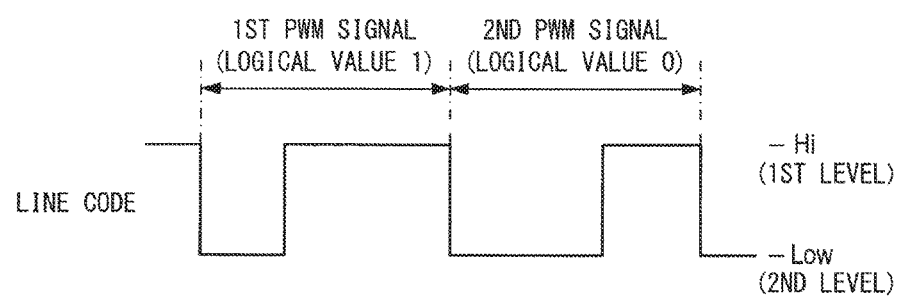
FIG. 2 illustrates a line code used by the communication system.

On the transmission line 5, as shown in FIG. 2, a pulse width modulation (PWM) signal is used as a line code, which has a changing signal level. The PWM signal may change at a bit boundary from a high level to a low level, for example, as shown at the beginning of the first PWM and second PWM signals, and may change in a middle of a bit from a low level to a high level. Further, two PWM signals having different duty ratios are used to represent a "logical value 1" and a "logical value 0" on the transmission line 5. Two PWM signals having different duty ratios mean that the two PWM signals have different low level times.

In the present embodiment, for the two types of PWM signals having different duty ratios, a PWM signal (i.e., the first PWM signal) with a shorter low level time corresponds to a "logical value 1", and a PWM signal (i.e., the second PWM signal) with a longer low level time corresponds to a "logical value 0."

For example, the first PWM signal is divided between the high level and the low level so that about one third of one bit is in the low level and the remainder of the one bit is in the high level. The second PWM signal has about two thirds of one bit in the low level and the remainder of the one bit in the high level. The one third and two third divisions of the one bit described above are a non-limiting example of how the one bit may be divided, and the one bit may be divided in different ways as well. Further, when the first PWM signal (i.e., logical value 1) and the second PWM signal (i.e., logical value 0) collide on the transmission line 5, the second PWM signal wins the arbitration. Note that the first PWM signal may correspond to a "logical value 0", and the second PWM signal may correspond to a "logical value 1."

When the transmission line 5 has a consecutive series of first PWM signals equal to or more than a preset value (e.g., equal to or more than 20 bits), the transmission line 5 may be considered to be in an idle state. In this example, 20 or more consecutive first PWM signals on the transmission line 5 may signify that the transmission line 5 is in an idle state. When the transmission line 5 is in an idle state, each node 3 is configured to perform a signal transmission. The communication system 1 may use an access control such as carrier-sense multiple access with collision avoidance (CSMA/CA), in which a node 3 detecting a loss in arbitration after the start of transmission immediately stops the transmission, and a node 3 detecting a win in arbitration continues transmission. A node 3 detects a loss in arbitration when it receives data having a "logical value 0" in spite of having transmitted communication data with a "logical value 1."

Further, a frame used for communication between the nodes 3 is provided with a header for specifying transmittable data, and a response of variable-length for transmitting the transmittable data specified by the header. The header includes an ID which is an identifier of the transmittable data. A win and a loss in the bus arbitration of a certain frame may be decided by the value of the ID in the header. On the other hand, in the response, size information indicating a data size of the response and a CRC code for checking errors may be included.

[1-3. Node]

The master node 3m outputs either of the first PWM signal or the second PWM signal to the transmission line 5. The slave node 3s does not perform an operation for outputting the first PWM signal to the transmission line 5. Further, when outputting the second PWM signal to the transmission line 5, the slave node 3s starts the signal output operation of the second PWM signal when the slave node 3s detects a signal level change of the transmission line 5 from a high level to a low level due to the signal output operation of the master node 3m.

[1-3-1. Master Node]

As shown in FIG. 1, the master node 3m may include a signal processor 10m, an encoder 11m, a rectifier 12m, a transmission buffer 13m, a reception buffer 14m, and a decoder 15m.

Figure 5:
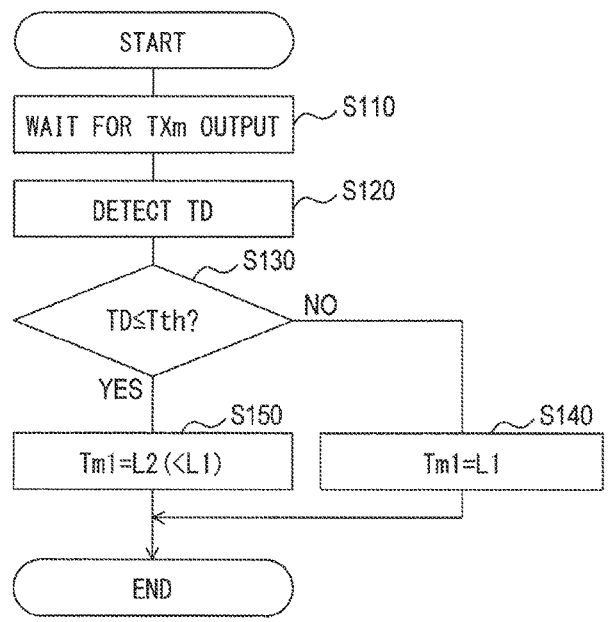
FIG. 5 is a flowchart of a time change process performed by the master node in the first embodiment of the present disclosure.

The signal processor 10m performs various processes assigned to the master node 3m based on information obtained through communication with the slave nodes 3s via the transmission line 5. For example, the signal processor 10m may be configured to perform the functions of a detector and a time changer. With reference to FIG. 5, the detection processing performed by the signal processor at S120 is the processing performed by the signal processor 10m functioning as the detector. With continued reference to FIG. 5, the time change processes described by S130-S150 of FIG. 5 are the processing performed by the signal processor 10m functioning as the time changer.

The signal processor 10m may be realized using one or more hardware components. When the signal processor 10m is realized by an electronic circuit, the electronic circuit may be a digital circuit, an analog circuit, or a combination of both, in addition to having many logical circuits. The signal processor 10m may include one or more application-specific integrated circuits (ASIC) or field-programmable gate arrays (FPGA) with these elements being configured to perform a specific process. For example, the signal processor 10m may have one dedicated electronic circuit to perform the functions and processes related to the detector and one dedicated electronic circuit to perform the functions and processes related to the time changer. Further, the signal processor 10m may be realized as a microcomputer and peripheral devices, including a CPU and semiconductor memory (i.e., "memory"), such as ROM, RAM, and/or a flash memory. In such case, various functions of the signal processor 10m are realized when the CPU executes a program stored in a non-transitive, substantive recording medium. In this example, a memory corresponds to a non-transitive, substantive recording medium for storing a program.

In the master node 3m, transmission data TXDm having a non-return-to-zero (NRZ) code (i.e., encoded with an NRZ code) is input to the encoder 11m from the signal processor 10m.

When an input of the transmission data TXDm is a "logical value 1", the encoder 11m outputs the first PWM signal as a transmission data signal TXm to the rectifier 12m. Further, when an input of the transmission data TXDm is a "logical value 0", the encoder 11m outputs the second PWM signal as a transmission data signal TXm to the rectifier 12m.

Note that when the transmission data TXDm is not output from the signal processor 10m (i.e., when the signal processor 10m does not transmit data), the encoder 11m is configured to receive an input of "logical value 1." Therefore, when the transmission data TXDm is not output from the signal processor 10m, the encoder 11m continues to output the first PWM signal that is used as a clock signal by the slave nodes 3s. Further, in such case, the transmission line 5 may be set to an idle state by the consecutive output of the first PWM signal from the encoder 11m.

The rectifier 12m rectifies, i.e., shapes, a waveform of the transmission data signal TXm output from the encoder 11m, i.e., a waveform of the first PWM signal or the second PWM signal, to be in a noise controlled shape. For example, the rectifier 12m may carry out a level reversal of the transmission data signal TXm together with an edge slope moderation of the level-reversed waveform of the transmission data signal TXm, and then output the rectified signal to the transmission buffer 13m.

The transmission buffer 13m is provided with an open collector type switching element 16 to enable an arbitration (i.e., bus arbitration) of the signal on the transmission line 5. Further, in the transmission buffer 13m, the rectified signal from the rectifier 12m is used as a high active driving signal of the switching element 16. That is, the transmission buffer 13m outputs the transmission data signal TXm from the encoder 11m to the transmission line 5 by switching the above-mentioned switching element 16 ON and OFF according to the rectified signal.

More practically, in the transmission buffer 13m, when the transmission data signal TXm changes from a high level to a low level and the rectified signal changes from a low level to a high level, the switching element 16 switches ON, and sets the signal level of the transmission line 5 to a low level. Further, when the transmission data signal TXm changes from a low level to a high level and the rectified signal changes from a high level to a low level, the switching element 16 switches OFF. Note that the slave node 3s may also be provided with the switching element 16. Further, when the switching element 16 in the master node 3m switches OFF, in cases where that the switching element(s) 16 in the other slave node(s) 3s is/are being switched OFF, the signal level of the transmission line 5 changes from a low level to a high level.

The reception buffer 14*m* rectifies the signal on the transmission line 5 to a rectangular PWM signal, and outputs the rectified PWM signal as a reception data signal RXm.

For example, the reception buffer 14*m* may be a comparator circuit with a hysteresis. As such, the reception buffer 14*m* may set the reception data signal RXm to a low level when the signal level of the transmission line 5 is smaller than a predetermined low side threshold VthL, and, may set the reception data signal RXm to a high level when the signal level of the transmission line 5 is higher than a predetermined high side threshold VthH. The low side threshold VthL and the high side threshold VthH are respectively set to a voltage value between a high level and a low level of the transmission line 5. Further, the high side threshold VthH is higher than the low side threshold VthL. That is, the reception buffer 14*m* determines, by comparing the two thresholds VthL and VthH with the signal level of the transmission line 5, whether the signal level of the transmission line 5 is in a high level or a low level. As such, the reception buffer 14*m* may also be referred to herein as a "determiner." Note that the low side threshold VthL and the high side threshold VthH may be the same value. In the following description, the low side threshold VthL and the high side threshold VthH are assumed to be the same threshold Vth.

The decoder 15*m* may decode, for example, a PWM-coded reception data signal RXm output from the reception buffer 14*m* to an NRZ encoding, and outputs a reception data RXDm encoded with an NRZ code to the signal processor 10*m*.

The decoder 15*m* reads the signal level of the reception data signal RXm, for example, after a lapse of preset sampling time after detecting the fall of the reception data signal RXm. The fall of the signal means a change of the signal level from a high level to a low level. Further, when the signal level read by the decoder 15*m* is at a high level, the decoder 15*m* determines that the reception data signal RXm is the first PWM signal (i.e., logical value 1), and sets the reception data RXDm with an NRZ encoding to a high level for a period of one bit. When the signal level read by the decoder 15*m* is at a low level, the decoder 15*m* determines that the reception data signal RXm is the second PWM signal (i.e., logical value 0), and sets the reception data RXDm with an NRZ encoding to a low level for a period of one bit.

Note that, when the transmission line 5 is in an idle state based on the consecutive output of the first PWM signal, the decoder 15*m*, based on a measurement of the low level time of the reception data signal RXm, is configured to set a sampling time as a duration by adding a preset time a to the measured low level time. A communication protocol of the communication system 1 may define that a specification time RT or greater be set as a difference between the low level time of the first PWM signal and the low level time of the second PWM signal on the transmission line 5. Therefore, the above-mentioned preset time a may be a duration that is equal to or slightly shorter than the specification time RT.

The signal processor 10*m* compares, bit by bit, each of the transmission data TXDm and each of the reception data RXDm corresponding thereto, and determines a collision of the TXDm and RXDm on the transmission line 5 when the signal level (i.e., logical value) of data TXDm and the signal level (i.e., logical value) of RXDm do not match. Further, when it is determined that the data has collided, the signal processor 10*m* stops an output of the transmission data TXDm to the encoder 11*m*. Note that, when the output of the transmission data TXDm from the signal processor 10*m* stops, an input to the encoder 11*m* is at a "logical value 1", and the first PWM signal continues to be output to the transmission line 5 from the master node 3*m*.

The encoder 11*m* is configured to change a low level time Tm1 of the first PWM signal, which is part of the transmission data signal TXm, based on an instruction from the signal processor 10*m*. The low level time Tm1 corresponds to the low level time of the first PWM signal that is output from the master node 3*m* to the transmission line 5.

Further, the encoder 11*m* is configured to also change a low level time Tm0 of the second PWM signal, which is part of the transmission data signal TXm, based on the low level time Tm1. The low level time Tm0 corresponds to the low level time of the second PWM signal that is output from the master node 3*m* to the transmission line 5. For example, the encoder 11*m* sets the low level time Tm0 to a duration of a preset time p (i.e., a time equal to or greater than RT) and the low level time Tm1 (i.e., a duration of 3+Tm1).

Note that the encoder 11*m* and the decoder 15*m* may be realized by, for example, an electronic circuit provided as a hardware component, or may be realized as a microcomputer.

The signal processor 10*m* performs a time change process described later, for instructing the encoder 11*m* to select one of the two (i.e., different duration) low level times that should be used as the low level time Tm1.

[1-3-2. Slave Node]

The slave node 3*s*, similar to the master node 3*m*, may include a signal processor 10*s*, an encoder 11*s*, a rectifier 12*s*, a transmission buffer 13*s*, a reception buffer 14*s*, and a decoder 15*s* as its components.

From among the components of the slave node 3*s* mentioned above, the same components having the same component names as the ones in the master node 3*m* play the same role in the slave node 3*s* as the components in the master node 3*m*. Note that, in the drawings and the following description, "TXDs" is a transmission data of a non-return-to-zero (NRZ) encoded input from the signal processor 10*s* to the encoder 11*s*. "TXs" is a transmission data signal converted to the PWM signal by the encoder 11*m*. "RXs" is a reception data signal as a PWM signal output from the reception buffer 14*s*. "RXDs" is a reception data decoded to a non-return-to-zero encoding by the decoder 15*s*.

However, the operation content of the encoder 11*s* in the slave node 3*s* is different from the one of the encoder 11*m* in the master node 3*m*. The signal processor 10*s* does not perform the time change process like the signal processor 10*m* in the master node 3*m*.

When the transmission data TXDs from the signal processor 10*s* is a "logical value 0," the encoder 11*s* outputs the second PWM signal as the transmission data signal TXs to the rectifier 12*s*, upon detecting a fall of the reception data signal RXs accompanying the signal level change of the transmission line 5 to a low level. More practically, when detecting a fall of the reception data RX, the encoder 11*s* outputs the transmission data signal TXs of the second PWM signal by setting the output level of the transmission data signal TXs to a low level for a preset low level time Ts0. The low level time Ts0 corresponds to the low level time of the second PWM signal that is output from the slave node 3*s* to the transmission line 5. The low level time Ts0 is set to be longer than the low level time Tm1 of the master node 3*m*.

When the transmission data TXDs from the signal processor 10*s* is a "logical value 1," the encoder 11*s* sets the output level of the transmission data signal TXs for the entire period of one bit. Therefore, when the transmission data TXDs is a "logical value 1," the operation for setting the transmission line 5 to the low level will not be performed in the slave node 3s. That is, the slave node 3s does not perform a signal output operation to output a signal to the transmission line 5 in such case. Thus, the signal level of the transmission line 5 changes to a signal level output by the master node 3m.

[1-4. Transmission Operation of Master Node]

Figure 3:
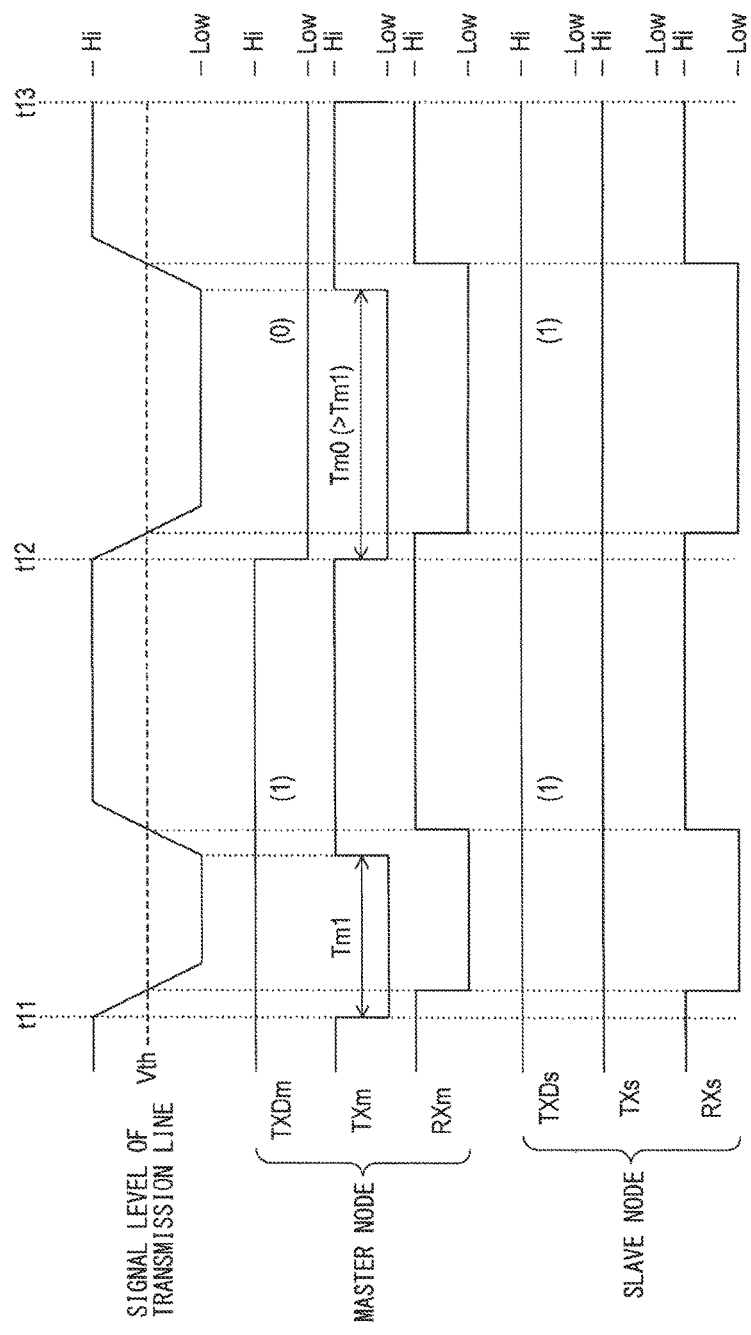
FIG. 3 illustrates a transmission operation of a master node.

The transmission operation of the master node 3m realized by the configuration of the master node 3m mentioned above is described with reference to FIG. 3. In FIG. 3, each of time t11, time t12, and time t13 is a bit boundary timing of the master node 3m. Further, the period from time t11 to time t12 is a one bit period during which the master node 3m outputs the first PWM signal corresponding to "logical value 1" to the transmission line 5. The period from time t12 to time t13 is one bit period during which the master node 3m outputs the second PWM signal corresponding to "logical value 0" to the transmission line 5.

As shown by the period of time t11-t12 in FIG. 3, when the transmission data TXDm is a "logical value 1" (i.e., when transmitting a "logical value 1"), the transmission data signal TXm changes to a low level for the low level time Tm1 from a start time of one bit period in the master node 3m. When the transmission data signal TXm changes to a low level, the switching element 16 of the transmission buffer 13m switches ON, and the signal level of the transmission line 5 changes to a low level. Further, while the signal level of the transmission line 5 is lower than the threshold Vth, the reception data signal RXm changes to a low level. Also, while the signal level of the transmission line 5 is lower than the threshold Vth, the reception data signal RXs changes to a low level in the slave node 3s.

As shown by the period of time t12-t13 in FIG. 3, when the transmission data TXDm is a "logical value 0" (i.e., when transmitting a "logical value 0"), the transmission data signal TXm changes to a low level for the low level time Tm0 from the start time of the one bit period in the master node 3m. Therefore, a "lower-than-threshold" time, during which the signal level of the transmission line 5 is lower than the threshold Vth, is longer compared to when transmitting a "logical value 1."

[1-5. Transmission Operation of Slave Node]

Figure 4:
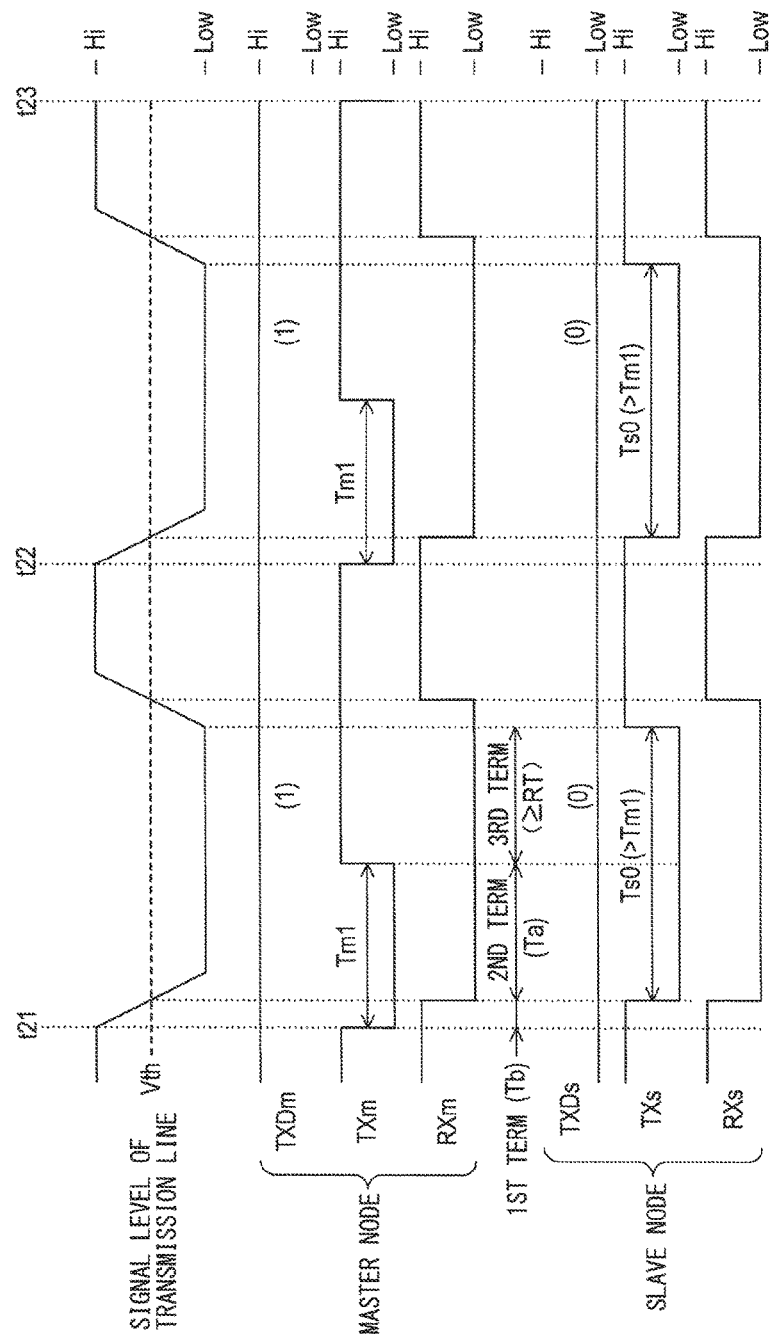
FIG. 4 illustrates a transmission operation of a slave node.

The transmission operation of the slave node 3s realized by the above-described configuration of the slave node 3s and described with reference to FIG. 4. In FIG. 4, each of time t21, time t22, and time t23 is a bit boundary timing of the master node 3m. Further, the period from time t21 to time t22 and the period from time t22 to time t23 are a one bit period during which the master node 3m outputs the first PWM signal corresponding to "logical value 1" to the transmission line 5. FIG. 4 illustrates an example situation in which the slave node 3s outputs a "logical value 0" in a period when the master node 3m outputs a "logical value 1."

As shown in FIG. 4, when the reception data signal RXs falls due to the signal output operation of the master node 3m, the transmission data signal TXs in the slave node 3s changes to a low level for the low level time Ts0 that is longer than the low level time Tm1. Further, even after the transmission data signal TXm in the master node 3m returns to a high level, while the transmission data signal TXs in the slave node 3s is in a low level, the signal level of the transmission line 5 is maintained in a low level by the transmission buffer 13s of the slave node 3s. Thereafter, when the transmission data signal TXs changes to a high level, the signal level of the transmission line 5 returns to a high level. That is, the first PWM signal output to the transmission line 5 by the master node 3m is changed to the second PWM signal output to the transmission line 5 by the slave node 3s.

Note that, the period from when the transmission data signal TXm in the master node 3m changes to a low level to when the transmission data signal TXs in the slave node 3s changes to a low level, referred to here as "a first term," is a period in which only the master node 3m sets the transmission line 5 to a low level. The duration of this first term is shown as time Tb.

Further, a period when the transmission data signal TXs in the slave node 3s changes to a low level to when the transmission data signal TXm in the master node 3m changes to a high level, referred to here as "a second term," is a period in which both of the master node 3m and the slave node 3s set the transmission line 5 to a low level. The duration of this second term corresponds to the duplex output time and is shown as time Ta.

Further, a period from when the transmission data signal TXm in the master node 3m changes to a high level to when the transmission data signal TXs in the slave node 3s changes to a high level, referred to here as "a third term," is a period in which only the slave node 3s sets the transmission line 5 to a low level. The low level time Ts0 is set to have a duration so that a duration of the third term is equal to or greater than the specification time RT defined by the communication protocol.

[1-6. Time Change Process]

The time change process performed by the signal processor 10m of the master node 3m is described with reference to FIG. 5.

The time change process shown in FIG. 5 is started, for example, in the period from when the operation of the master node 3m is started by receiving a power supply to a first output of the transmission data signal TXm from the encoder 11m.

The first output of the transmission data signal TXm mentioned above is the first PWM signal for putting the transmission line 5 in an idle state. Note that not only the PWM signal representing data but also the first PWM signal for putting the transmission line 5 in an idle state are considered as a PWM signal for communication in the communication system 1.

As shown in FIG. 5, when starting the time change process, the signal processor 10m waits for the first output of the transmission data signal TXm from the encoder 11m in S110. More practically, the signal processor 10m waits until the transmission data signal TXm falls. Fall of the transmission data signal TXm corresponds to one of the instructions given to the rectifier 12m and the transmission buffer 13m, which instructs a signal level change of the transmission line 5 from a high level to a low level.

Figure 6:
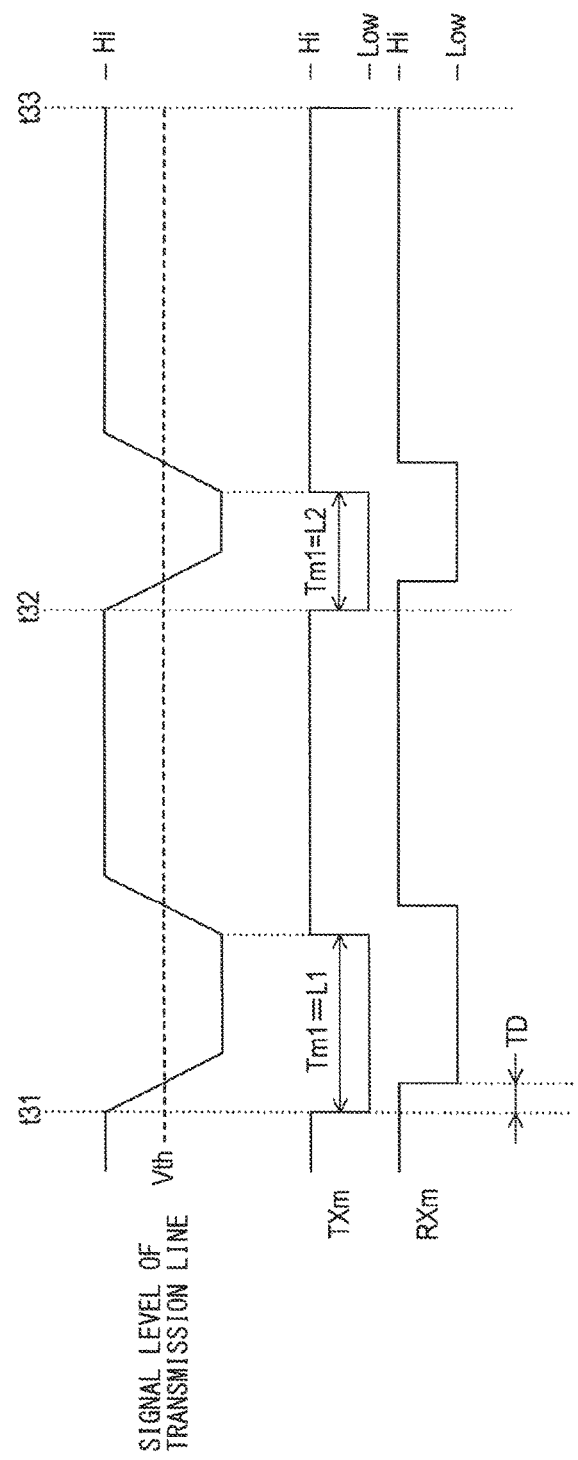
FIG. 6 illustrates an effect of the time change process in the first embodiment of the present disclosure.

Upon having the first output of the transmission data signal TXm from the encoder 11m, at S120 the signal processor 10m detects a time delay TD from a fall of the transmission data signal TXm to a fall of the reception data signal RXm as shown in FIG. 6. The time of the fall of the reception data signal RXm corresponds to a time when the reception buffer 14m determines the signal level change of the transmission line 5 from a high level to a low level. The time delay TD corresponds to an index value correlating to the time constant "τ" of the transmission line 5. The time delay TD becomes longer as τ becomes larger. The fall time (i.e., when the fall occurs) of the reception data signal RXm used to detect the time delay TD may be referred to as a determination (i.e., a detection time) of the signal level change of the transmission line 5 from a high level to a low level by the determiner. The high level in this case may be referred to as a "pre-change level" and the low level may be referred to as a "post-change level."

The signal processor 10m determines whether the time delay TD detected in S120 is equal to or less than a predetermined value Tth in S130. The specification range of τ defined for the communication system 1 may be, for example, "1-5." The predetermined value Tth is set as a value (e.g., 5 microseconds) of the time delay TD in case T is a median of the specification range i.e., "a specification median," that is, the specification median may refer to the predetermined time constant in the specification range.

When it is determined that the time delay TD is not equal to or less than the predetermined value Tth in S130, e.g., when τ is greater than the specification median, the process proceed to S140. In S140, the signal processor 10m instructs the encoder 11m to set a first time L1 as the low level time Tm1, and ends the time change process after S140.

The signal processor 10m proceeds to S150, when it is determined that the time delay TD is equal to or less than the predetermined value Tth in S130 (e.g., when τ of the transmission line 5 is equal to or less than the specification median). In S150, the signal processor 10m instructs the encoder 11m to set a second time L2 that is shorter than the first time L1, and ends the time change process after S150.

Note that, in the encoder 11m, the first time L1 may be set as a default value of the low level time Tm1. Thus, in cases where the encoder 11m receives instructions to set the second time L2 in S150, the encoder 11m is configured to set the second time L2 specified in the instruction, and the change to the second time L2 is reflected in the transmission data signal TXm the next time or thereafter.

Figure 7:
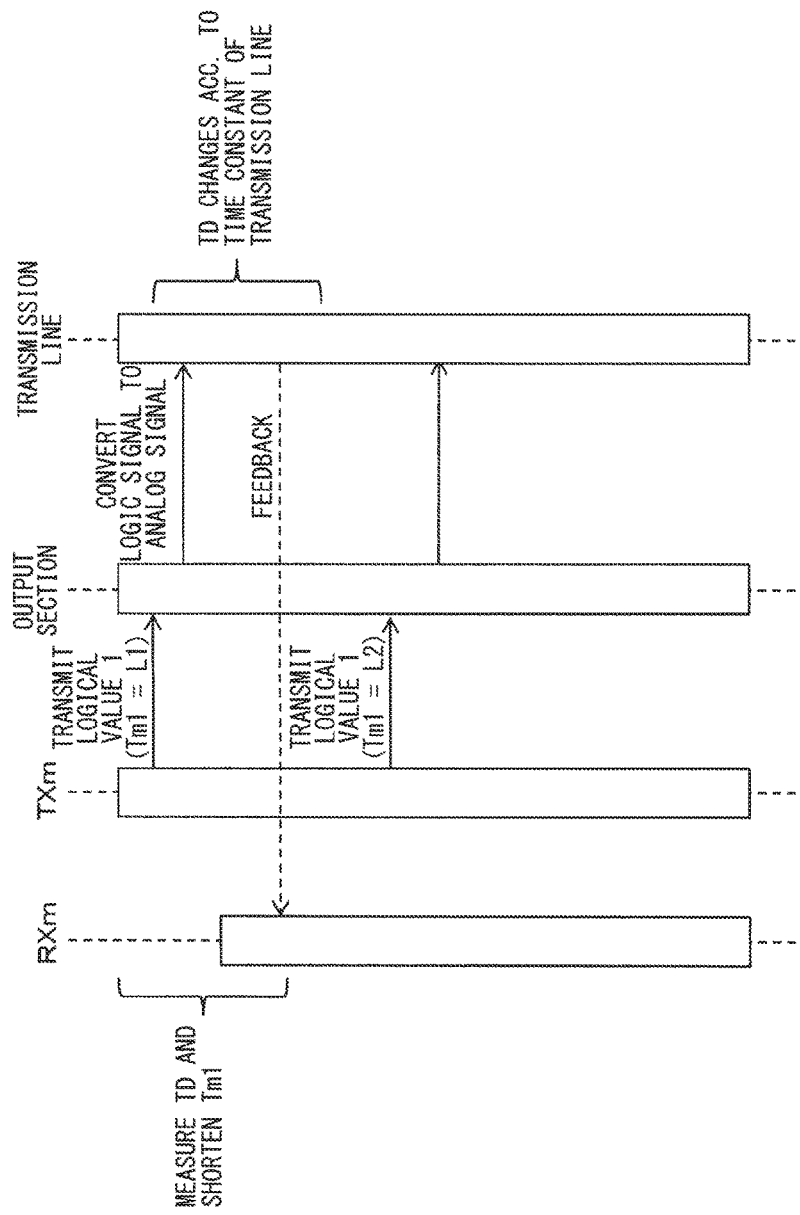
FIG. 7 is a ladder chart of an operation for changing a low level time of a transmission data signal.

By performing the above-mentioned time change process, when the time delay TD is equal to or less than the predetermined value Tth, the low level time Tm1 of the transmission data signal TXm as the first PWM signal output from the encoder 11m is changed to the second time L2 that is shorter than the first time L1, as shown in FIG. 6. Note that, in FIG. 6, each of time t31, time t32, and time t33 is a bit boundary time in the master node 3m. Further, each period from time t31 to time t32 and from time t32 to time t33 is a one bit period in which the master node 3m outputs the first PWM signal to the transmission line 5. Further, a ladder chart in FIG. 7 is used to illustrate an operation for realizing the change of the low level time Tm1 shown in FIG. 6. The output section referred to in FIG. 7 may include the rectifier 12m and the transmission buffer 13m, that is, the rectifier 12m and the transmission buffer 13m may be referred to as an "output section" for outputting a PWM signal to the transmission line 5. The fall of the transmission data signal TXm used to detect the time delay TD can be considered as an instruction to the output section to cause a signal level change of the transmission line 5 from a high level to a low level. That is, the instruction to the output section may include instructions for outputting one of the first PWM signal and the second PWM signal from the communication device to the transmission line for communication.

The signal processor 10m functioning as the detector may detect the index value as the time delay TD from the time of giving the instruction (i.e., an instruction timing) to the output section for the signal level change of the transmission line from the pre-change level to the post-change level, to the detection timing of the signal level change of the transmission line from the pre-change level to the post-change level.

[1-7. Operational Effects]

In the master node 3m, the low level time Tm1 of the transmission data signal TXm as the first PWM signal that is output from the encoder 11m is changed according to τ of the transmission line 5.

Figure 8A:
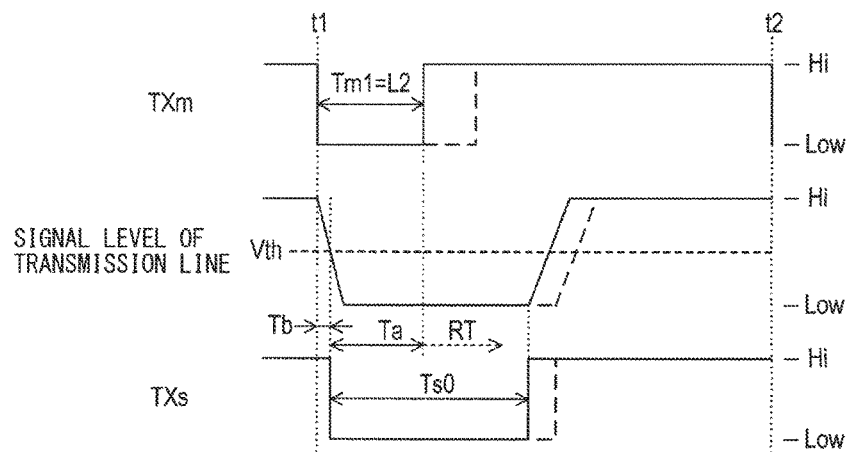
FIG. 8A illustrates operational effects in the first embodiment of the present disclosure.
Figure 8B:
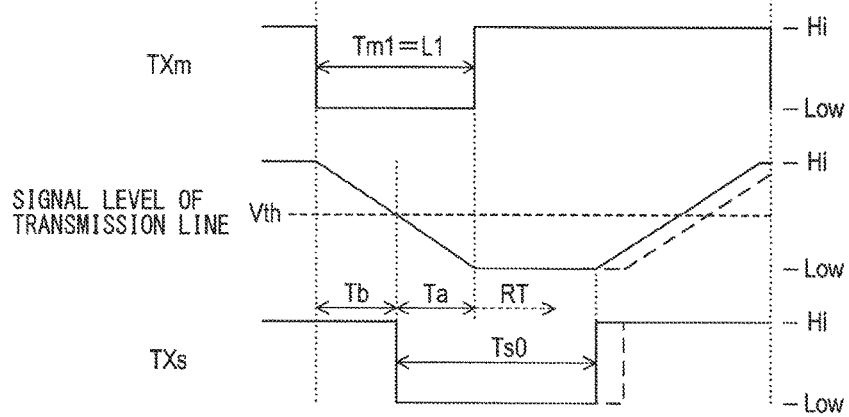
FIG. 8B illustrates operational effects in the first embodiment of the present disclosure.

When τ of the transmission line 5 is greater than the specification median (e.g., 3), as shown in FIG. 8B, the low level time Tm1 of the transmission data signal TXm as the first PWM signal that is output from the encoder 11m changes to the first time L1. The first time L1 is set as a time which enables the signal level of the transmission line 5 to be changed to a low level, even when r is the specification maximum (e.g., 5). Note that, in FIGS. 8A and 8B, time t1 and time t2 are bit boundary timings.

Further, when τ of the transmission line 5 is equal to or less than the specification median, as shown in FIG. 8A, the low level time Tm1 of the transmission data signal TXm as the first PWM signal that is output from the encoder 11m is the second time L2 that is shorter than the first time L1. The second time L2 may be set as a duration which enables the signal level of the transmission line 5 to be changed to a low level even when τ is the specification median. Therefore, the second time L2 may be of a shorter duration than the first time L1.

On the other hand, the low level time Ts0 of the transmission data signal TXs as the second PWM signal that is output from the encoder 11s of the slave node 3s may be set to satisfy both of the following conditions.

As one condition, the duration of the low level time Ts0 is longer by an amount equal to or greater than the specification time RT and the duplex output time Ta, when (i) τ is the specification minimum (e.g., 1), and (ii) the low level time Tm1 of the transmission data signal TXm is the second time L2.

As another condition, the duration of the low level time Ts0 is longer by an amount equal to or greater than the specification time RT and the duplex output time Ta, when (i) τ is the specification median, and (ii) the low level time Tm1 of the transmission data signal TXm is the first time L1.

Figure 12A:
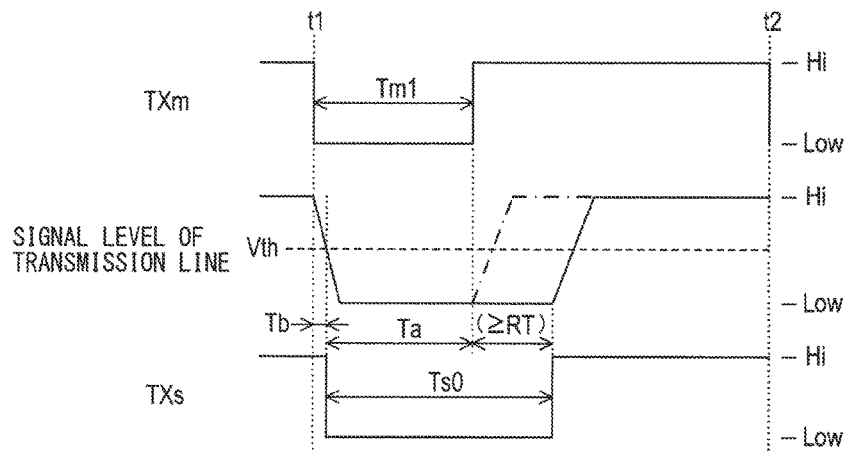
FIG. 12A illustrates effects in related technology.
Figure 12B:
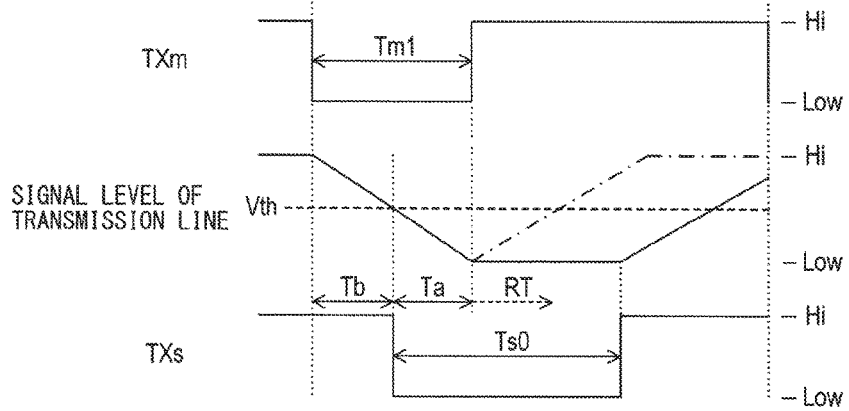
FIG. 12B illustrates effects in related technology.

The low level time Ts0 satisfying both of the above conditions for the present embodiment, described with reference to FIGS. 8A and 8B, may be shorter than the low level time Ts0 of TXs for the related technology, as shown in FIGS. 12A and 12B. For the related technology, the low level time Ts0 of TXs in FIGS. 12A and 12B is the low level time Ts0 that is required for TXs when the low level time Tm1 of the master node 3m is set as a fixed value. As a comparative example between the present embodiment and the related technology, note that the dotted line waveform in FIGS. 8A and 8B represents the solid line waveform of the related technology shown in FIGS. 12A and B, that is, the waveform of setting the low level time Tm1 as a fixed value, instead of setting Tm1 as a variable value as contemplated by the present embodiment.

That is, the master node 3m of the present embodiment easily enables, a difference between the low level time of the first PWM signal that is output from the master node 3m, and the low level time of the second PWM signal that is output from the slave node 3s, by an amount of equal to or greater than the specification time RT, even when the low level time Ts0 of the slave node 3s is shortened. Further, since it enables a shorter low level time Ts0 of the slave node 3s, bit errors such as bit straddling and bit shortfalls, e.g., situations where the signal level of the transmission line 5 does not return to the high level before the bit boundary of the next bit when t of the transmission line 5 is a large value, are limited or prevented. Therefore, both of (i) providing a sufficient difference between the low level time of the first PWM signal output from the master node 3m and the low level time of the second PWM signal output from the slave node 3s by an amount of equal to or greater than the specification time RT, and (ii) the limitation/prevention of bit errors are easily achievable at the same time without compromise. As such, the communication speed of the communication system 1 can be easily increased.

Further, the signal processor 10m of the master node 3m detects the time delay TD from when the transmission data signal TXm falls to when the reception data signal RXm falls as an index value correlating to τ of the transmission line 5. Therefore, an index value is obtainable by simple processing in the present embodiment.

Further, in the master node 3m, a fall of the transmission data signal TXm used to detect the time delay TD, is the fall of the transmission data signal TXm given to the rectifier 12m from the encoder 11m for an output of the first PWM signal for the communication via the transmission line 5. Therefore, an additional, dedicated signal for detecting the time delay TD need not be generated in the present embodiment.

As a modification of the above-described embodiment, the time delay TD in S120 of FIG. 5 may be detected as a duration of time from a rise of the transmission data signal TXm to a rise of the reception data signal RXm. A rise of the signal means a change of the signal level from a low level to a high level. Further, the transmission data signal TXm used to detect the time delay TD may be the transmission data signal TXm of the second PWM signal. These modifications may be similarly applicable to other embodiments described herein.

2. Second Embodiment

[2-1. Difference from the First Embodiment]

Since the configuration of the second embodiment is basically the same as that of the first embodiment, the following description focuses on the difference between the first embodiment and the second embodiment. The reference numerals for features and elements of the first embodiment are used to refer to the corresponding features and elements of the second embodiment. Repeated descriptions of such corresponding features and elements have been omitted for brevity.

In the communication system 1 of the second embodiment, the low level time Tm1 of the transmission data signal TXm output from the encoder 11m of the master node 3m as the first PWM signal may be fixed to the first time L1 described above. Therefore, the low level time Tm0 of the transmission data signal TXm output from the encoder 11m as the second PWM signal may also be of a fixed duration.

Figure 9:
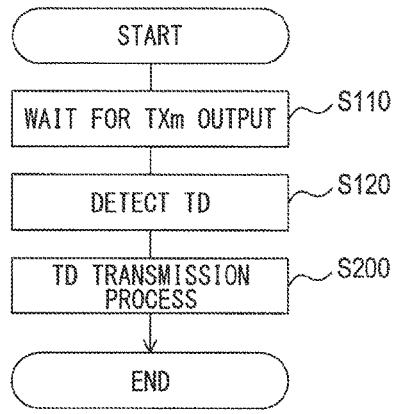
FIG. 9 is a flowchart of a detection process performed by the master node in a second embodiment of the present disclosure.

The signal processor 10m of the master node 3m may perform a detection process as shown in FIG. 9, instead of performing the time change process of FIG. 5.

As indicated by the dashed arrow extending from the signal processor 10s of the slave node 3s in FIG. 1, the encoder 11s of the slave node 3s is configured to change the low level time Ts0 of the transmission data signal TXs. The transmission data signal TXs is then output as the second PWM signal, based on an instruction from the signal processor 10s.

Figure 10:
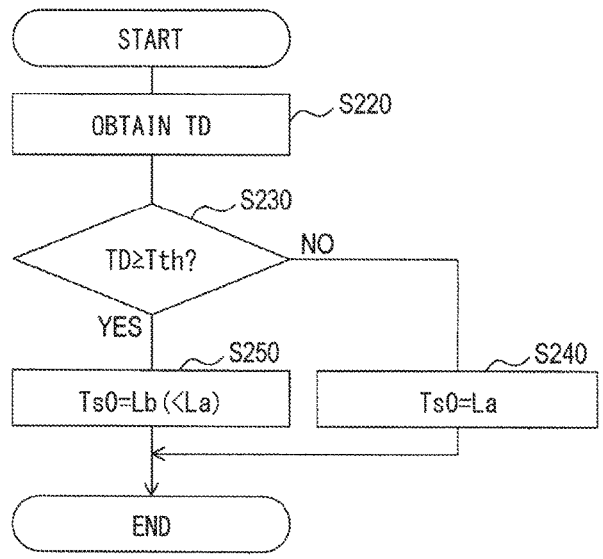
FIG. 10 is a flowchart of a time change process performed by the slave node in the second embodiment of the present disclosure.

Further, the signal processor 10s of the slave node 3s may perform the time change process shown in FIG. 10, to provide low level time Ts0 instructions to the encoder 11s.

[2-2. Detection Process]

As shown in FIG. 9, as compared with the time change process of FIG. 5 performed by the signal processor 10m of the master node 3m, the detection process has S200 instead of having S130-S150

In S200, the signal processor 10m performs a TD transmission process for transmitting the time delay TD detected in S120 to the slave node 3s. More specifically, the signal processor 10m generates a transmission frame containing detection result data showing a detection result of the time delay TD, and outputs a bit string of the generated transmission frame to the encoder 11m, to transmit the transmission frame to the transmission line 5. Then, the signal processor 10m ends the detection process of FIG. 9.

[2-3. Time Change Process]

The signal processor 10s of the slave node 3s performs a time change process of FIG. 10, when it receives the transmission frame including the above-described detection result data.

As shown in FIG. 10, upon starting the time change process, the signal processor 10s extracts and obtains the detection result data from the received frame in S220. By obtaining the detection result data, the signal processor 10s obtains the time delay TD detected by the master node 3m.

In S230, the signal processor 10s determines whether the time delay TD obtained in S220 is equal to or greater than the above-described predetermined value Tth.

When the signal processor 10s determines in S230 that the time delay TD is not equal to or greater than the predetermined value Tth, i.e., "NO" at S230, the signal processor 10s proceeds to S240. That is, when T of the transmission line 5 is less than the specification median, the process proceeds to S240. In S240, the signal processor 10s instructs the encoder 11s to set a first time La to the low level time Ts0, and ends the time change process after S240.

The signal processor 10s proceeds to S250, when the signal processor 10s determines in S230 that the time delay TD is equal to or greater than the predetermined value Tth, i.e., YES at S230, when T of the transmission line 5 is equal to or greater than the specification median. In S250, the signal processor 10s instructs the encoder 11s to set a second time Lb that is shorter than the first time La to the low level time Ts0, and ends the time change after S250.

In the encoder 11s, the first time La may be set as a default value of the low level time Ts0. When the second time Lb is instructed in S250, the encoder 11s is configured to reflect the second time Lb to the transmission data signal TXs to be transmitted at the next transmission.

[2-4. Operational Effects]

In the slave node 3s, the low level time Ts0 of the transmission data signal TXs output from the encoder 11s as the second PWM signal is changed according to t of the transmission line 5.

Figure 11A:
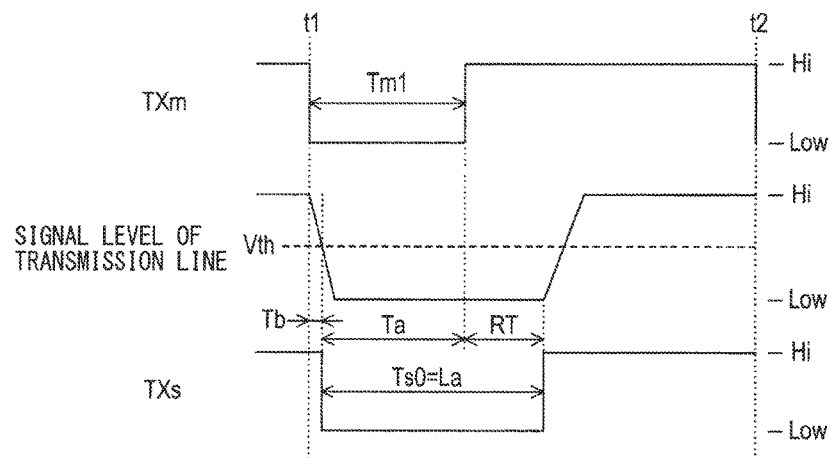
FIG. 11A illustrates operational effects in the second embodiment of the present disclosure.
Figure 11B:
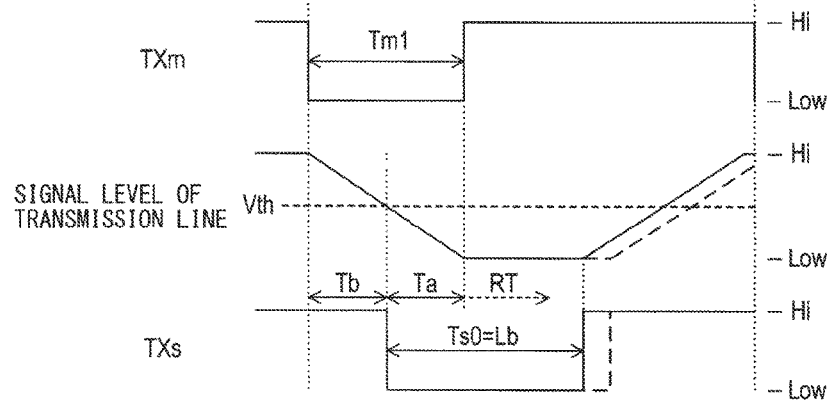
FIG. 11B illustrates operational effects in the second embodiment of the present disclosure.

When τ of the transmission line 5 is less than the specification median, as shown in FIG. 11A, the low level time Ts0 of the transmission data signal TXs output from the encoder 11s as the second PWM signal changes to the first time La. The first time La is set as a longer duration by an amount equal to or greater than the specification time RT and the duplex output time Ta in cases where τ is the specification minimum. In FIGS. 11A and 11B, each of time t1 and time t2 is a bit boundary time.

Further, when τ of the transmission line 5 is equal to or greater than the specification median, as shown in FIG. 11B, the low level time Ts0 of the transmission data signal TXs output from the encoder 11s as the second PWM signal changes to the second time Lb that is shorter than the first time La.

The duration of the second time Lb may be longer by an amount equal to or greater than the specification time RT and the duplex output time Ta, in cases where τ is the specification median. Therefore, the second time Lb may be shorter than the first time La. When τ is a large value, the low level time Ts0 is prevented from taking an excessive value, thereby limiting a bit error such as a bit straddling or a bit shortfall. The dotted line waveform shown in FIG. 11B illustrates, as a comparative example, the waveform of the related technology shown by the solid line waveform in FIG. 12B. The dotted line waveform in FIG. 11B illustrates a transmission line signal that occurs in the related technology by setting the low level time Ts0 as a fixed value, instead of setting Ts0 as a variable value, as contemplated by the present embodiment.

According to the second embodiment, both of (i) providing a sufficient difference between the low level time of the first PWM signal output from the master node 3m and the low level time of the second PWM signal output from the slave node 3s by an amount of equal to or greater than the specification time RT and (ii) the limitation/prevention of the bit errors (e.g., bit straddling, bit shortfall) are easily achievable at the same time. Therefore, the communication speed of the communication system 1 can be easily increased.

In the second embodiment, similar to the first embodiment, the time delay TD is detected as an index value correlating to r, and as such, the index value is obtainable by simple processing. Thus, it is not necessary to generate an additional, dedicated signal exclusively for the detection of the time delay TD.

In the second embodiment, the signal processor 10m of the master node 3m may perform the functions of a detector, where the process of S120 in FIG. 9 corresponds to the functions and processing performed by the detector. The detection result data transmitted to the slave node 3s from the master node 3m corresponds to the information indicative of a detection result of an index value. The signal processor 10s of the slave node 3s may perform the functions of both an obtainer and a time controller. The process of S220 in FIG. 10 is the processing performed by the signal processor 10s functioning as an obtainer. The processes of S230-S250 in FIG. 10 are the processing performed by the signal processor 10s functioning as a time controller.

As a modification of the present embodiment, in the master node 3m, the time delay TD detected in S120 of FIG. 9 may be converted to τ, and the data indicative of the converted τ may be transmitted from the master node 3m to the slave node 3s as the detection result data. In such a case, in S220 of FIG. 10, the signal processor 10s of the slave node 3s obtains the value of τ as the information indicative of the detection result of the index value. Therefore, the signal processor 10s may determine, in S230 of FIG. 10, whether the value of τ obtained in S220 is equal to or greater than the specification median.

Further, the detection result data may be transmitted (i.e., provided) from the master node 3m to the slave node 3s via a route other than the transmission line 5.

The second embodiment, either in part or as a whole, may be combined with the first embodiment.

3. Other Embodiments

Although various embodiments and modifications are disclosed in the above, the present disclosure is not necessarily limited to the above.

For example, the index value correlating to τ of the transmission line 5 may be a value other than the above-mentioned time delay TD. That is, a voltage value of the transmission line 5 after a preset lapse time from the change of the transmission data signal TXm either to a high level or to a low level may be detected as an index value.

Further, the low level time Tm1 in the first embodiment and the low level time Ts0 in the second embodiment may be changed to three or more values according to the detection result of the index value, or they may be linearly changed according to the detection result of the index value.

Such changes, modifications, and summarized schemes are to be understood as being within the scope of the present disclosure as defined by appended claims.

What is claimed is:

1. A communication device serving as a master node of a communication system having a plurality of nodes connected by a transmission line, data communication among the plurality of nodes configured to use a first level signal in a first level, and a second level signal in a second level, a line code of the data communication via the transmission line configured
    (i) to use two types of pulse width modulation (PWM) signals among which one has a longer second level time than the other when implementing signal modulation as a signal level change of first to second level at a bit boundary and a signal level change of second to first level in a middle of a bit, and
    (ii) to have same-time outputs of the first level signal and the second level signal from different nodes arbitrated to the second level signal of the transmission line,
the master node configured to output either a first PWM signal having a shorter second level time or a second PWM signal having the longer second level time, and a slave node provided as at least one node among the plurality of nodes other than the master node and configured to start a signal output operation to output the second PWM signal to the transmission line at a detection timing of the signal level change of first to second level of the transmission line due to a signal output operation of the master node, the communication device comprising:
a detector configured to detect an index value correlating to a time constant of the transmission line; and
a time changer configured to change the second level time of the first PWM signal to be output to the transmission line according to the index value detected by the detector, wherein
the time changer sets the second level time of the first PWM signal to a shorter duration of time when the index value indicates a smaller-than preset time constant value within a specification range of the time constant value of the communication system than when the index value indicates a greater-than preset time constant value.

2. The communication device of claim 1 further comprising:
an output section configured to output the first PWM signal and the second PWM signal to the transmission line; and
a determiner configured to determine whether a signal level of the transmission line is the first level or the second level by comparing the signal level of the transmission line with at least one threshold that is set as a potential between the first level and the second level, wherein the detector detects the index value as a time delay from an instruction timing of giving an instruction to the output section for the signal level change of the transmission line from a pre-change level to a post-change level, the pre-change level being one of the first level and the second level and the post-change level being other one of the first level and the second level, to the detection timing of the signal level change of the transmission line from the pre-change level to the post-change level.

3. The communication device of claim 2, wherein the instruction used for the detection of the time delay instructs the output section for outputting one of the first PWM signal and the second PWM signal from the communication device to the transmission line for the communication.

4. A communication system serving as a master node of a communication system having a plurality of nodes connected to a transmission line, data communication among the plurality of nodes configured to use a first level signal in a first level and a second level signal in a second level, a line code of the data communication via the transmission line configured (i) to use two types of pulse width modulation (PWM) signals among which one has a longer second level time than the other when implementing signal modulation as a signal level change of first to second level at a bit boundary and a signal level change of second to first level in a middle of a bit, and (ii) to have same-time outputs of the first level signal and the second level signal from different nodes arbitrated to the second level signal of the transmission line, the master node configured to output either a first PWM signal having a shorter second level time or a second PWM signal having the longer second level time, and a slave node provided as at least one node among the plurality of nodes and configured to start a signal output operation to output the second PWM signal to the transmission line at a detection timing of the signal level change of first to second level of the transmission line due to a signal output operation of the master node, the communication system comprising:

a detector in the master node configured to detect an index value correlating to a time constant of the transmission line;

an obtainer in the slave node configured to obtain information indicative of a detection result of the index value from the master node; and a time controller in the slave node configured to change the second level time of the second PWM signal to be output from the slave node to the transmission line according to the information obtained by the obtainer, wherein the time controller sets the second level time of the second PWM signal to a shorter duration of time when the information indicates a smaller-than preset time constant value within a specification range of the time constant value of the communication system than when the information indicates a greater-than preset time constant value.

5. The communication system of claim 4, wherein the master node further includes:

an output section configured to output the PWM signal to the transmission line; and a determiner configured to determine whether a signal level of the transmission line is the first level or the second level by comparing the signal level of the transmission line with at least one threshold that is set as a potential between the first level and the second level, wherein the detector detects the index value as a time delay from an instruction timing of giving an instruction to the output section for the signal level change of the transmission line from a pre-change level to a post-change level, the pre-change level being one of the first level and the second level and the post-change level being other one of the first level and the second level, to a detection timing of the signal level change of the transmission line from the pre-change level to the post-change level.

6. The communication system of claim 5, wherein the instruction used for the detection of the time delay instructs the output section for outputting one of the first PWM signal and the second PWM signal from the master node to the transmission line for the communication.

* * * * *

UNITED STATES PATENT AND TRADEMARK OFFICE
CERTIFICATE OF CORRECTION

PATENT NO. : 10,305,672 B2
APPLICATION NO. : 16/051661
DATED : May 28, 2019
INVENTOR(S) : Naoji Kaneko and Takamori Ookawa Page 1 of 1

It is certified that error appears in the above-identified patent and that said Letters Patent is hereby corrected as shown below:

On the Title Page

Item (30), correct the Foreign Application Priority Data:
"Aug. 9, 2017 (JP) ............... 2014-154152" to
-- Aug. 9, 2017 (JP) ............... 2017-154152 --

Signed and Sealed this
Sixth Day of August, 2019

Andrei Iancu
*Director of the United States Patent and Trademark Office*